(12) United States Patent
Johnson

(10) Patent No.: US 9,356,795 B2
(45) Date of Patent: May 31, 2016

(54) COMMUNICATION TERMINAL, WIRELESS COMMUNICATION NETWORK SYSTEM AND CONTENT DISTRIBUTION METHOD

(75) Inventor: Brian Johnson, San Francisco, CA (US)

(73) Assignees: SONY CORPORATION, Tokyo (JP); SONY MOBILE COMMUNICATIONS, INC., Tokyo (JP)

(*) Notice: Subject to any disclaimer, the term of this patent is extended or adjusted under 35 U.S.C. 154(b) by 1317 days.

(21) Appl. No.: 12/427,805

(22) Filed: Apr. 22, 2009

(65) Prior Publication Data
US 2009/0271473 A1 Oct. 29, 2009

(30) Foreign Application Priority Data
Apr. 23, 2008 (JP) .............................. P2008-113001

(51) Int. Cl.
*G06F 15/16* (2006.01)
*H04L 12/28* (2006.01)
(Continued)

(52) U.S. Cl.
CPC ........ *H04L 12/2814* (2013.01); *G06Q 20/1235* (2013.01); *H04L 12/2812* (2013.01);
(Continued)

(58) Field of Classification Search
CPC G06F 17/3074; G06Q 20/1235; H04L 65/60; H04L 65/4076; H04H 40/90; H04R 2227/005
USPC ........................................................ 709/202
See application file for complete search history.

(56) References Cited

U.S. PATENT DOCUMENTS

2002/0194351 A1* 12/2002 Nishimura et al. ........... 709/229
2004/0264775 A1 12/2004 Slobodin
(Continued)

FOREIGN PATENT DOCUMENTS

| JP | 2002 116768 | 4/2002 |
|----|-------------|--------|
| JP | 2003-228538 | 8/2003 |
| JP | 2007-13705  | 1/2007 |

OTHER PUBLICATIONS

Antchev, G.; Cano, E.; Chatellier, S.; Cittolin, S.; Erhan, S.; Gigi, D.; Gutleber, J.; Jacobs, C.; Meijers, F.; Nicolau, R.; Orsini, L.; Pollet, L.; Racz, A.; Samyn, D.; Sinanis, N.; Sphicas, P., "A software approach for readout and data acquisition in CMS," in Real Time Conference, 1999. Santa Fe 1999. 11th IEEE NPSS, vol., no., pp. 301-306, 1999.*

(Continued)

*Primary Examiner* — Taylor Elfervig
(74) *Attorney, Agent, or Firm* — Frommer Lawrence & Haug LLP; William S. Frommer; Ellen Marcie Emas

(57) ABSTRACT

A wireless communication network system includes a reproducing device reproducing a predetermined content, a first communication terminal, and a second communication terminal. The first communication terminal has a receiving section receiving predetermined data by wireless communication, a first storage section storing therein a software that enables acquiring data of the content currently being reproduced by the reproducing device during a period when the content is being reproduced, and a first controller controlling the receiving section to receive the data of the content through the software. The second communication terminal has a second storage section having the software stored therein, a transmitting section transmitting predetermined data to both the reproducing device and the first communication terminal by wireless communication, and a second controller controlling the transmitting section to transmit the data of the content to the reproducing device and transmit the software to the first communication terminal.

12 Claims, 13 Drawing Sheets

(51) Int. Cl.
*G06Q 20/12* (2012.01)
*H04L 29/06* (2006.01)

(52) U.S. Cl.
CPC ............. *H04L65/4076* (2013.01); *H04L 65/60* (2013.01); *H04L 2012/2841* (2013.01); *H04L 2012/2849* (2013.01)

(56) References Cited

U.S. PATENT DOCUMENTS

| | | | |
|---|---|---|---|
| 2005/0021494 | A1 | 1/2005 | Wilkinson |
| 2005/0238325 | A1* | 10/2005 | Tanabe et al. .................. 386/95 |
| 2006/0059095 | A1 | 3/2006 | Akins, III et al. |
| 2006/0262221 | A1* | 11/2006 | Yuasa et al. .................... 348/553 |
| 2007/0106940 | A1* | 5/2007 | Angelovich ................... 715/727 |
| 2007/0237115 | A1 | 10/2007 | Bae et al. |
| 2008/0022003 | A1* | 1/2008 | Alve ............................. 709/229 |
| 2008/0115189 | A1* | 5/2008 | Lejeune ........................ 725/141 |
| 2008/0133544 | A1* | 6/2008 | Fujimoto ........................ 707/10 |
| 2008/0151702 | A1* | 6/2008 | Yuasa et al. ................. 369/24.01 |
| 2010/0164836 | A1* | 7/2010 | Liberatore ..................... 345/1.1 |
| 2010/0284669 | A1* | 11/2010 | Sasaki ........................... 386/252 |

OTHER PUBLICATIONS

Hanks, J., "Integrating data acquisition and mathematics software," in WESCON/94. Idea/Microelectronics. Conference Record, vol., no., pp. 186-188, Sep. 27-29, 1994.*

* cited by examiner

COMMUNICATION TERMINAL, WIRELESS COMMUNICATION NETWORK SYSTEM AND CONTENT DISTRIBUTION METHOD

PARTIES TO A JOINT RESEARCH AGREEMENT

This Application is a result of activities undertaken within the scope of a Joint Research Agreement between Sony Corporation and Telefonaktiebolaget L. M. Ericsson.

BACKGROUND OF THE INVENTION

1. Field of the Invention

The present invention relates to a communication terminal, a wireless communication network system and a content distribution method. More particularly, the present invention relates to a communication terminal, a wireless communication network system and a content distribution method used in a local area network.

2. Description of the Related Art

As a content distribution system for distributing content such as music, video and the like, various proposals have been made to provide systems which allow clients to, after having read information about the content distributed via the Internet, easily order (purchase) the content from the Internet (see, for example, Japanese Unexamined Patent Application Publication No. 2002-116768). Many of such content distribution systems allow the clients who have interest in acquiring the content to view or listen to the content when placing the order.

In addition to the global content distribution systems for distributing the content via the Internet, various proposals have also been made to provide various kinds of content distribution systems which distribute the content via a local network such as an in-home LAN (Local Area Network) or the like. One of such systems is a network system conforming to the DLNA (Digital Living Network Alliance) standard (referred to as a "DLNA network system" hereinafter).

The DLNA standard is a standard for allowing information appliances such as AV (audio and visual) devices, personal computers and the like to connect to each other in a local network area such as a home, so that the information appliances can be used in a collaborative manner. Specifically, the DLNA standard is a standard which prescribes connection conditions (such as medium format, communication procedure between the respective devices, user interface and the like) between a server that records, stores and supplies the content (such as music and video) and a reproducing device (i.e., a player) that reproduces the content.

In the DLNA network system, processing operations such as transmitting the content data to the local network, pulling the content data from the local network, uploading the content data to the local network, downloading the content data from the local network and the like are mainly performed between the server and the reproducing device. In other words, in such a local network system, the data of the content is shared between the server and the reproducing device during the period when the processing operation (such as reproduction of the content) is performed. Incidentally, in the case where the job of recording and storing the content is performed by a device, and the job of controlling the supply of the content to the reproducing device is performed by another device, the data of the content is shared between the three devices.

Further, in the DLNA network system, in the case where there is a communication terminal other than the server and the reproducing device registered in the system, the owner (referred to as "viewer" hereinafter) of the communication terminal can view the content folder stored in the server.

SUMMARY OF THE INVENTION

In the aforesaid DLNA network system, the owner (referred to as "viewer" hereinafter) of the communication terminal other than the server and the reproducing device connected in the system can conveniently view the latest content exchanged between the server and the reproducing device. However, in such a DLNA network system, the following problems will occur when the viewer try to receive the content currently being reproduced (for example, when the viewer tries to share or transfer the content data).

In a system such as the aforesaid DLNA network system, the viewer can view the content folder stored in the server. Thus, when the viewer wants to receive the content currently being reproduced, he or she has to read the server so as to pull out or download the data of the desired content. However, if the viewer does not know which content data in the content folder of the server is the content currently being reproduced, he or she will not be able to acquire the desired content.

Further, in the case where the server wants to distribute and upload content data to a plurality of viewers, the server has to individually select the viewers who want to receive the content data.

The above problems will become more pronounced in the case where an event such as a party, a wedding, a trade show, a retail store or the like is held, when the organizer wants to distribute a content to the attendees, and when the attendees would like to receive the content currently being reproduced. Herein, the aforesaid problems will be concretely described below using examples of a party, a wedding and a trade show.

First, let us see what problems will occur in a party. Suppose that one of the attendees of the party sets his or her portable communication terminal and connects it to an acoustic device in the party hall to distribute his or her playlist to an acoustic communication device, so that the music distributed by him or her can be shared by the other attendees (viewers). In such a case, in the aforesaid DLNA network system, the music (content) currently being reproduced can only be shared between the acoustic device and the portable communication terminal of the attendee who has distributed the music.

In such a case, even when the viewers try to read the content folder of the portable communication terminal (i.e., the server) of the attendee who supplies the music in order to acquire the desired music, they will not be able to acquire the desired content unless they know who the owner of the server is. Further, even if they know who the owner of the server is, they still will not be able to acquire the desired unless they know information such as the title of the music, the name of the artist and/or the like.

Further, in the case where the viewers directly ask the owner of the server who supplies the music to acquire the music, the file which includes the music can only be individually supplied to the viewers after reproduction of the music is complete, instead of being supplied to the viewers during the period when the content is being reproduced. Thus, as described above, with a system like the DLNA network system, the viewers can not easily acquire the music currently being reproduced while enjoying the music, even if they want to do so.

Next, let us see what problems will occur in a trade show. Suppose that a company transmits their promotional material from a server thereof to a reproducing device via a system such as the aforesaid DLNA network system to reproduce the promotional material so as to introduce their exhibits to the attendees of the trade show. The company is eager to distribute their promotional material to the attendees who have interest in their exhibits. However, with the system such as the aforesaid DLNA network system, since the promotional material is only shared between the server and the reproducing device during the period when the promotional material is being reproduced, the promotional material currently being reproduced can not be electronically distributed to the attendees easily and immediately. Thus, in many cases printed promotional material is distributed to the attendees having interest in the exhibits. However, since the cost of the printed promotional material and the expenses for distributing the printed promotional material are big financial burdens to the company, such a method is not a cost-effective method for advertising the company.

Next, let us see what problems will occur in a wedding. Playing slide show of memorable photos of the bride and groom is common at weddings. Nowadays, in many cases, the photo slide show is played by connecting a computer, which has photo data in a digital format stored therein, to a projector through wireless communication. In such a case, since the photo data is shared only between the computer and the projector during the period when the slide show is being played, when an attendee (viewer) wants to receive one of the photos, there is no simple, immediate way to provide the photo to the attendee.

As can be known from the above, the system such as the DLNA network system is inconvenient because it only allows the content data to be shared between the server and reproducing device during the period when the content is being reproduced, and it does not allow a viewer other than the server and reproducing device to conveniently acquire the content currently being reproduced.

In view of the aforesaid problems, it is desired to provide a communication terminal, a wireless communication network system and a content distribution method which allow a viewer to easily and immediately acquire a content within a local network conforming to the DLNA standard or the like, during the period when the content is being reproduced.

A communication terminal according to an embodiment of the present invention includes a transmitting section for transmitting, by wireless communication, predetermined data to both a reproducing device and another communication terminal registered in a predetermined wireless communication network system. The communication terminal further includes a storage section having a software stored therein that enables acquiring data of a predetermined content currently being reproduced by the reproducing device during a period when the content is being reproduced. The communication terminal further includes a controller for controlling the transmitting section to transmit the data of the content to the reproducing device and transmit the software to the another communication terminal.

The communication terminal is a communication terminal for supplying the content. As can be known from the above, the communication terminal has a function of transmitting a software that enables acquiring data of a content during a period when the content is being reproduced, so that, by supplying the software to the other communication terminal connected to the network, the other communication terminal can easily acquire the content data through use of the software during the period when the content is being reproduced.

A communication terminal according to another embodiment of the present invention includes a receiving section for receiving, by wireless communication, predetermined data from a server registered in a predetermined wireless communication network system. The communication terminal according to the aforesaid embodiment further includes a storage section for storing therein a software that enables acquiring data of a predetermined content currently being reproduced by a reproducing device registered in the wireless communication network system during a period when the content is being reproduced. The communication terminal according to the aforesaid embodiment further includes a controller for controlling the receiving section to receive the data of the content from the server through the software.

The communication terminal is a communication terminal which receives the content. As can be known from the above, the communication terminal has a function of receiving content data through use of a software that enables acquiring data of a content during a period when the content is being reproduced, so that, by receiving the software, the content currently being reproduced can be acquired through use of the software. Incidentally, the software can either be previously downloaded to the communication terminal, or be downloaded from the server.

A wireless communication network system according to further another embodiment of the present invention includes a reproducing device for reproducing a predetermined content and a first communication terminal capable of acquiring the content currently being reproduced. The wireless communication network system according to the aforesaid embodiment further includes a second communication terminal capable of transmitting a predetermined data to both the reproducing device and the first communication terminal. In the wireless communication network system according to the aforesaid embodiment, the first communication terminal includes a receiving section for receiving predetermined data by wireless communication, and a first storage section for storing therein a software that enables acquiring data of the content currently being reproduced by the reproducing device during a period when the content is being reproduced. In the wireless communication network system according to the aforesaid embodiment, the first communication terminal further includes a first controller for controlling the receiving section to receive the data of the content through use of the software. In the wireless communication network system according to the aforesaid embodiment, the second communication terminal includes a second storage section having the software stored therein and a transmitting section for transmitting predetermined data to both the reproducing device and the first communication terminal by wireless communication. In the wireless communication network system according to the aforesaid embodiment, the second communication terminal further includes a second controller for controlling the transmitting section to transmit the data of the content to the reproducing device and transmit the software to the first communication terminal.

As can be known from the above, in the wireless communication network system, the second communication terminal has a function of transmitting the software to the first communication terminal registered in the system, the software enabling acquiring the content data currently being reproduced by the reproducing device during a period when the content is being reproduced. Further, the first communication terminal has a function of acquiring the content data from the server through use of the software during the period when the content is being reproduced. Thus, in the case where the first communication terminal has acquired the software from the second communication terminal and installed the software, the owner of the first communication terminal can easily acquire the content currently being reproduced through use of the software.

A content distribution method according to further another embodiment of the present invention includes the steps of:

causing a server to supply a communication terminal with a software that enables acquiring data of a predetermined content currently being reproduced by a reproducing device during a period when the content is being reproduced, where the server, the communication terminal and the reproducing device are registered in a predetermined wireless communication network system;

causing the server to transmit the data of the content to the reproducing device to allow the reproducing device to reproduce the content;

causing the communication terminal to transmit a request for acquiring the content to the server through use of the software during the period when the content is being reproduced; and causing the server to, during the period when the content is being reproduced, receive the request for acquiring the content from the communication terminal through use of the software and transmit the data of the content to the communication terminal through use of the software.

In the content distribution method, as described above, the owner (viewer) of the communication terminal other than the server and the reproducing device can easily make a content acquisition request and acquire the content through use of the software that enables acquiring a content during a period when the content is being reproduced.

As described above, according to the aforesaid embodiments of the present invention, the viewer within the network can acquire the content currently being reproduced from the server through use of the software that enables acquiring a content currently being reproduced by the reproducing device during a period when the content is being reproduced. Thus, according to the aforesaid embodiments of the present invention, the viewer can easily and immediately acquire a content during the period when the content is being reproduced, even within a network system conforming to the DLNA standard.

DETAILED DESCRIPTION OF THE PREFERRED EMBODIMENT(S)

A communication terminal and a wireless communication network system including the communication terminal according to an embodiment of the present invention will be described below with reference to the attached drawings. Note that the present invention is not limited the embodiments described below.

[Wireless Communication Network System]

Figure 1:
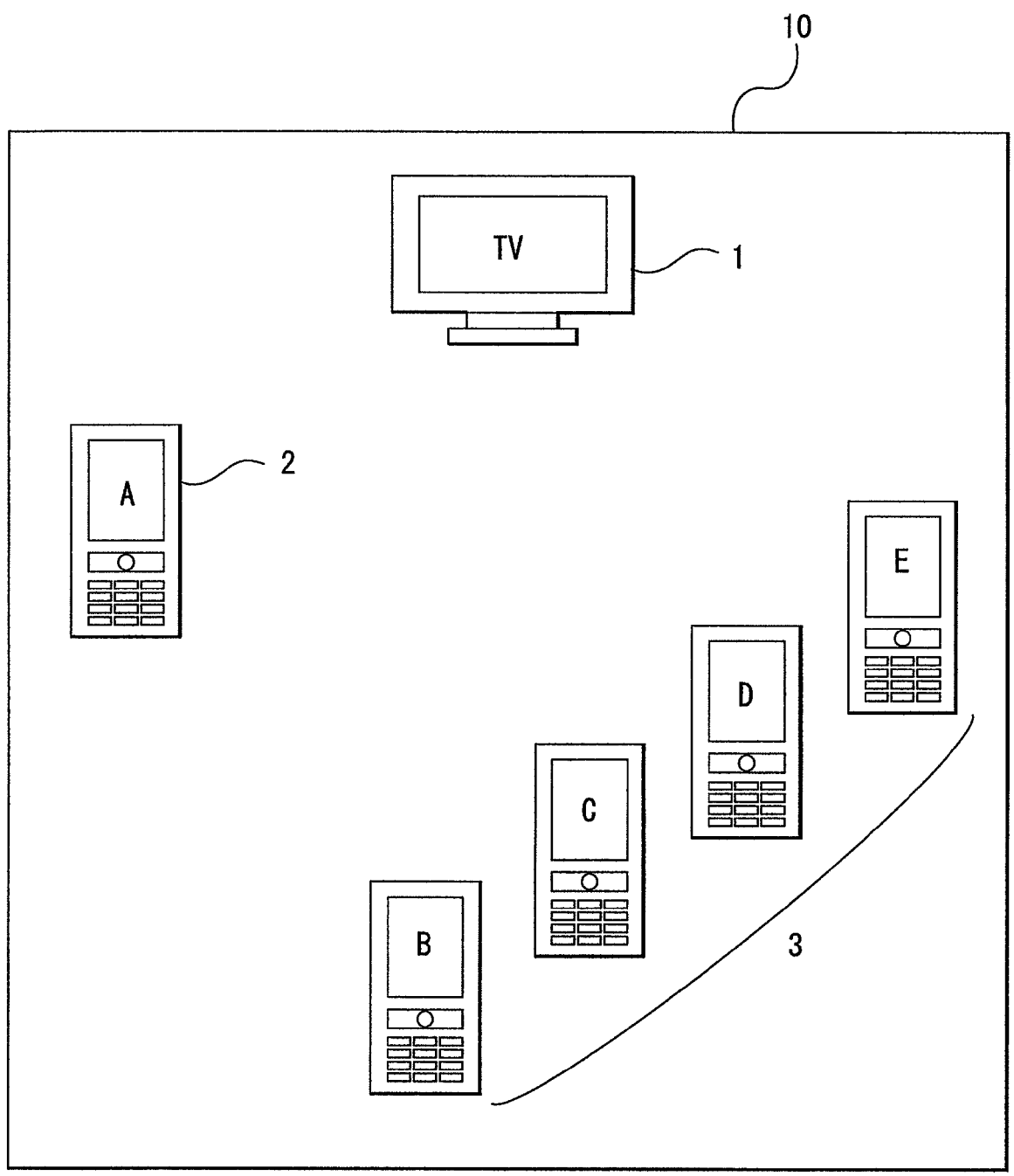
FIG. 1 is a view schematically showing a configuration of a wireless communication network system according to an embodiment of the present invention.

FIG. 1 schematically shows a configuration of a wireless communication network system 10 according to the present embodiment. As shown in FIG. 1, the wireless communication network system 10 includes a reproducing device 1 for reproducing a content, a server 2 for supplying the content to the reproducing device 1, and a plurality of communication terminals 3 (connected via wireless communication) registered in the network. Incidentally, the wireless communication network system 10 according to the present embodiment is a network system conforming to the DLNA standard. That is, the reproducing device 1, the server 2 and the plurality of communication terminals 3 are connected based on the DLNA standard, so that wireless communication can be performed between each other.

Further, the present embodiment is described using an example in which mobile communication terminals are used as both the server 2 and the communication terminals 3. Incidentally, the mobile communication terminal herein is a mobile phone terminal for performing wireless communication with a wireless phone base station. Further, the present embodiment is described using an example in which a TV 1 is used as the reproducing device 1.

Figure 2:
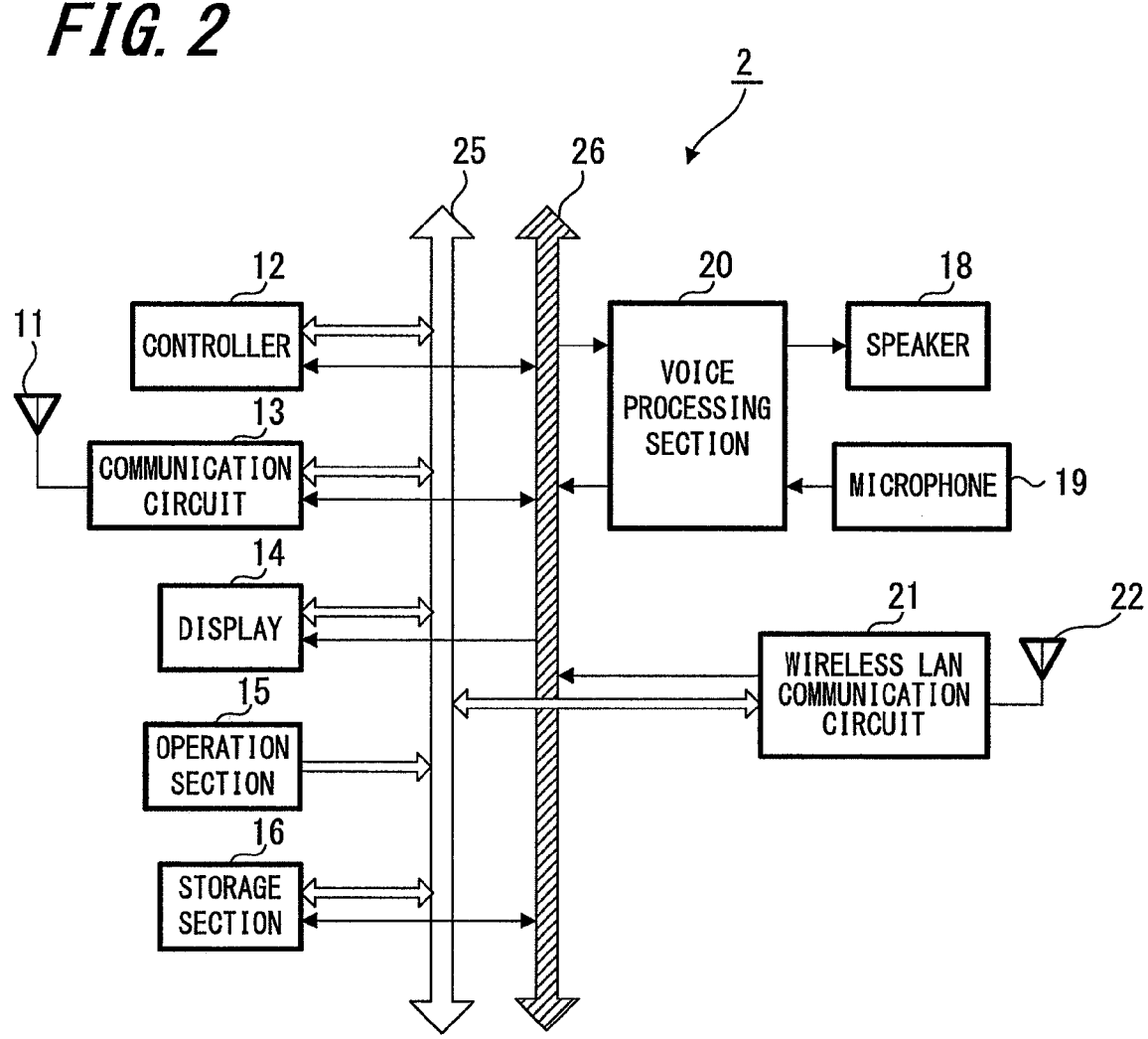
FIG. 2 is block diagram schematically showing a mobile communication terminal according to the embodiment of the present invention.

FIG. 2 schematically shows a block diagram of the server 2 (the mobile communication terminal A of FIG. 1). As shown in FIG. 2, the server 2 includes an antenna 11, a controller 12, a communication circuit 13 connected to the antenna 11, a display 14, an operation section 15 and a storage section 16. Further, the server 2 includes a wireless LAN communication circuit 21 and a wireless LAN antenna 22. Further, the server 2 includes a speaker 18 for outputting voice during a call, a microphone 19 for capturing voice during a call, and a voice processing section 20 for digital-analog converting the voice data obtained during a call.

Further, as shown in FIG. 2, the server 2 includes a control line 25 and a data line 26. The control line 25 is a signal line for passing through signals for controlling respective sections connected thereto. As shown in FIG. 2, some of the sections of the server 2 are connected to the controller 12 through the control line 25, so that the processing of these sections is performed under the control of the controller 12. The data line 26 is a signal line for transferring data between the respective sections connected thereto. Further, though not shown in FIG. 2, the server 2 is provided with a power section for supplying electric power to the respective sections.

The controller 12 is composed of an arithmetic and control unit such as a CPU (Central Processing Unit) for controlling the respective sections of the server 2. The controller 12 controls transmission processing while the content (such as music and video) is distributed to the TV 1. Further, the controller 12 also controls transmission processing while transmitting a software (referred to as a "content acquisition software" hereinafter) to the plurality of communication terminals 3 (mobile communication terminals B-E of FIG. 1), the software enabling acquiring data of a content during a period when the content is being reproduced.

Under the control of the controller 12, the communication circuit 13 transmits a transmission signal to the mobile phone base station (not shown) and receives a reception signal from the mobile phone base station through the antenna 11. Further, the communication circuit 13 also modulates and demodulates the electric wave used for exchanging communication with the mobile phone base station.

The display 14 is composed of an LCD (Liquid Crystal Display) or the like. Further, the operation section 15 is composed of a jog dial, a key pad and the like. The operation section 15 can be used to perform input operation (such as inputting a phone number, a mail text or the like), enter input operation signals for setting various modes and the like.

The storage section 16 is composed of a nonvolatile memory such as a flash memory (a semiconductor memory). Various kinds of data and programs such as phonebook, schedule, mail message, video picture, still picture, music, application software, bookmark, webpage and the like are stored in the storage section 16. In other words, the content acquisition software to be distributed to the plurality of communication terminals 3 in the wireless communication network system 10 and the data of the content to be supplied to the TV 1 are stored in the storage section 16.

Under the control of the controller 12, the wireless LAN communication circuit 21 performs predetermined modulation and demodulation, and transmits/receives wireless signals to/from an external access point unit (not shown) through the wireless LAN antenna 22. Incidentally, in the present embodiment, through the wireless LAN communication circuit 21 and the wireless LAN antenna 22, the server 2 distributes the content to the TV 1 and distributes the content acquisition software to the communication terminals 3. Distribution processing of both the content and the content acquisition software is performed under the control of the controller 12.

Further, as shown in FIG. 1, it is supposed that four communication terminals 3 are registered in the wireless communication network system 10 of the present embodiment. The four communication terminals 3 (i.e., the mobile communication terminals B-E) each have the same configuration as the server 2 (i.e., the mobile communication terminal A). In other words, the four communication terminals 3 each have the configuration shown in FIG. 2. Incidentally, the communication terminals 3 receive the content acquisition software and the content from the server 2 through the wireless LAN communication circuit 21 and the wireless LAN antenna 22.

Further, in each of the communication terminals 3, the content acquisition software is stored in the storage section 16. The content acquisition software can either be previously downloaded to the storage section 16, or be downloaded from the server 2 as described later.

[Content Distribution Processing Example 1]

A content distribution processing example 1 according to the present embodiment will be described below with reference to FIGS. 3 to 9. Note that, in order to make correspondence relation to FIGS. 3 and 7 (which show steps of distribution processing) clear, it is supposed that the server 2 is the mobile communication terminal A and the four communication terminals 3 are the mobile communication terminals B-E in the description below.

Figure 3:
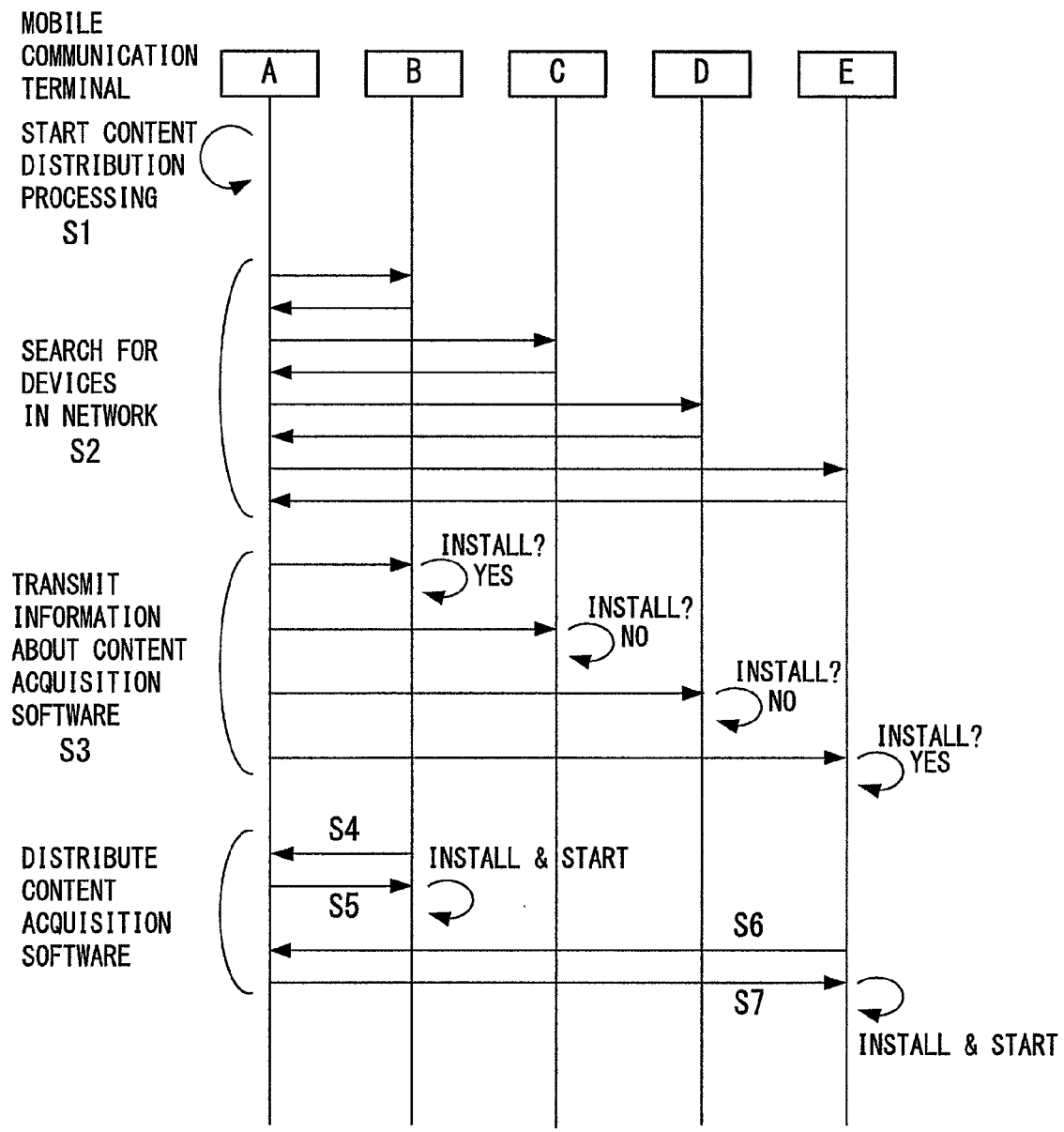
FIG. 3 is a view showing the flow of processing operation of a content distribution processing according to the embodiment of the present invention in time sequence, before reproduction of the content is started.
Figure 4:
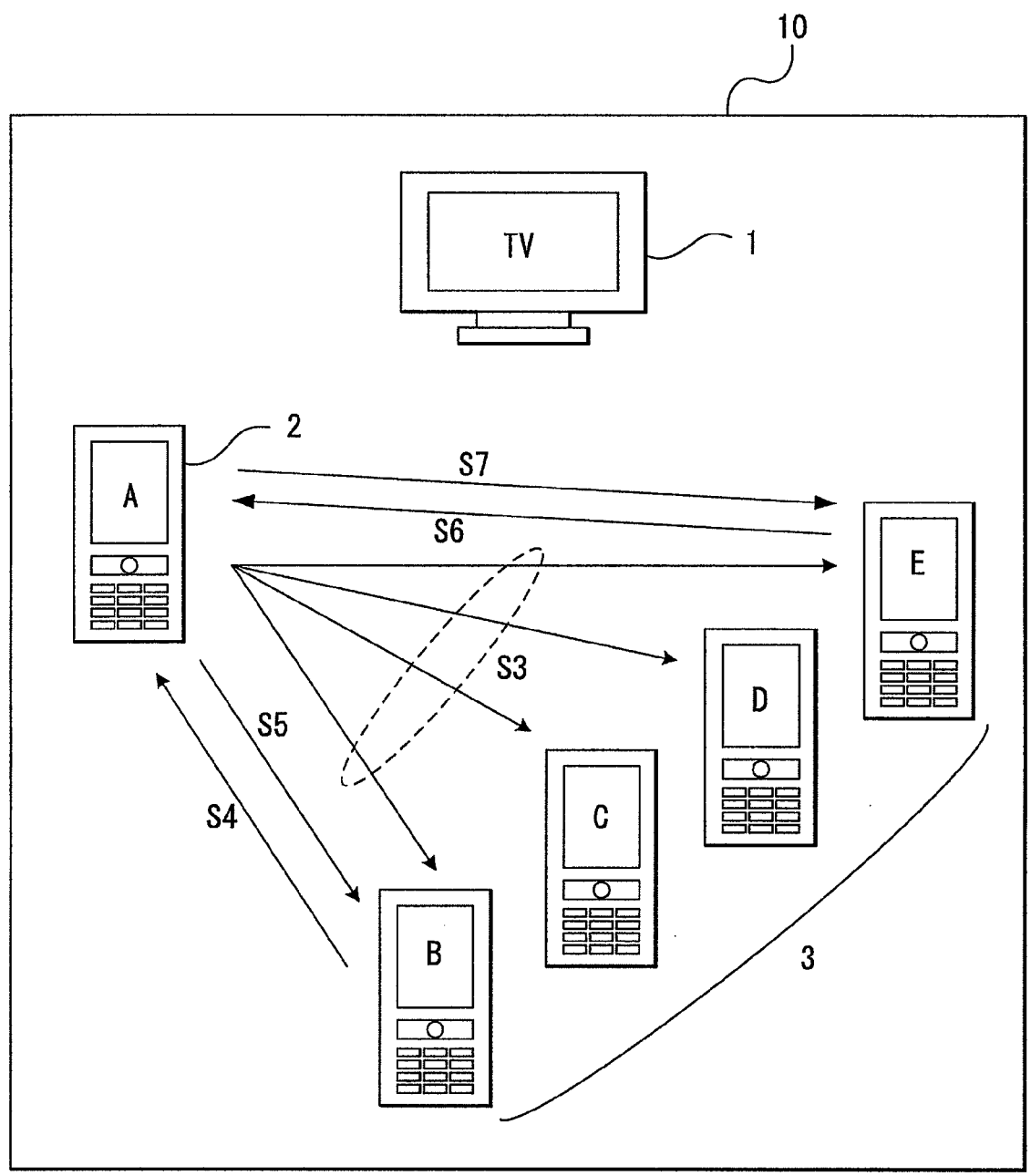
FIG. 4 is a view showing the flow of data in spatial sequence during the processing operation of the content distribution processing according to the embodiment of the present invention, before reproduction of the content is started.
Figure 5:
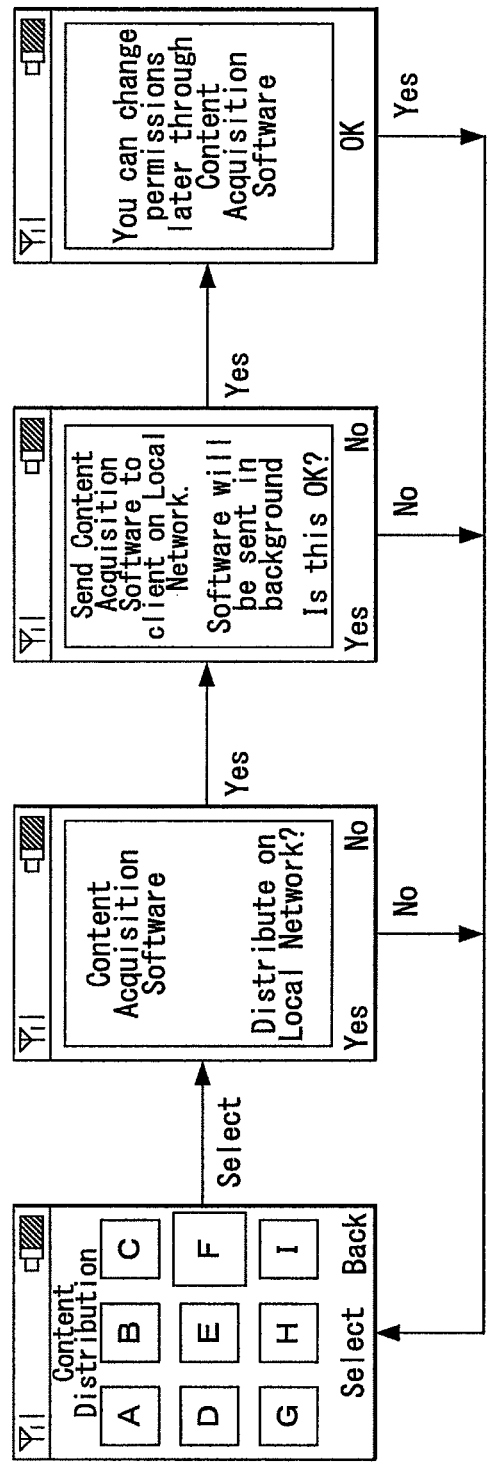
FIGS. 5A to 5D are views showing an example of messages indicated on a display of a server, in each of processing steps before reproduction of the content is started.
Figure 6:
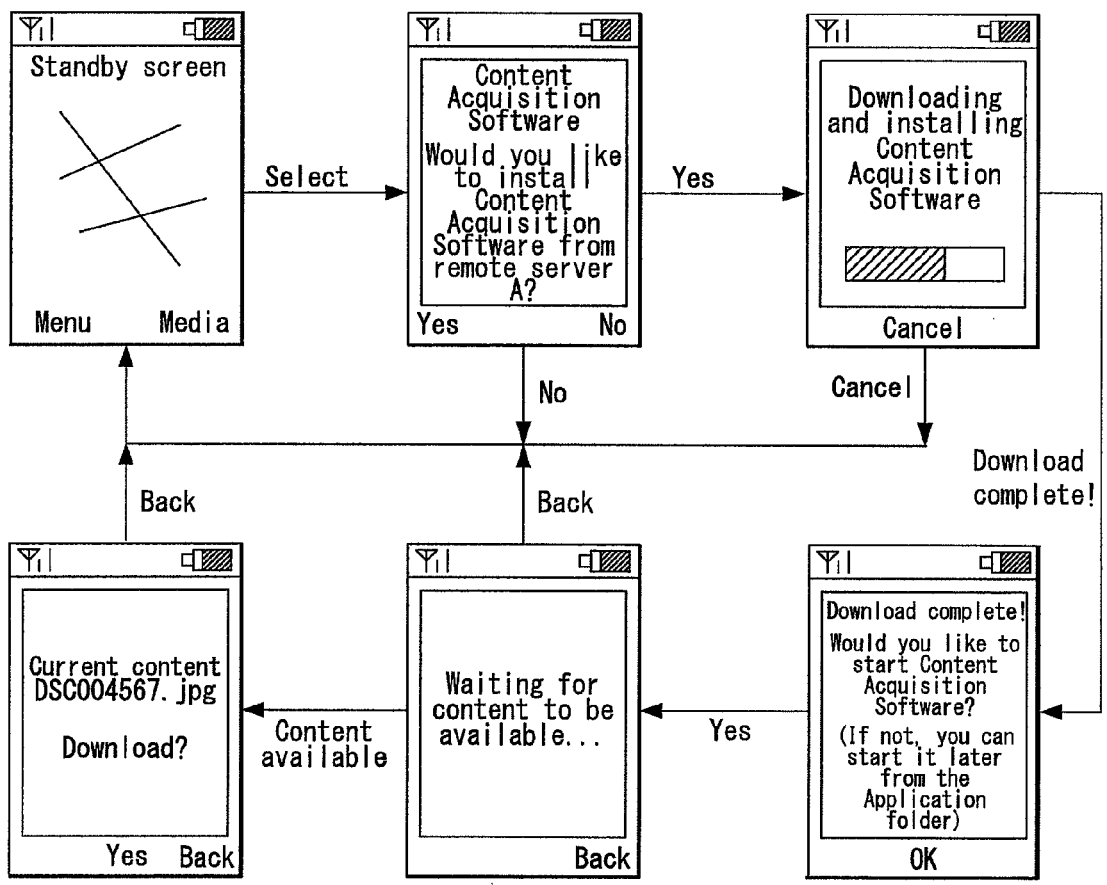
FIGS. 6A to 6F are views showing an example of messages indicated on a display of a mobile communication terminal that receives the content, in each of processing steps before reproduction of the content is started.

First, the processing steps before reproduction of the content by the TV 1 is started are described below with reference to FIGS. 3 to 6. FIG. 3 is a view showing the flow of data between the respective devices in time sequence before reproduction of the content is started; and FIG. 4 is a view schematically showing the flow of data between the respective devices in spatial sequence before reproduction of the content is started.

Further, FIGS. 5A to 5D are views showing a concrete example of messages indicated on the display 14 of the mobile communication terminal A in each of processing steps before reproduction of the content is started. FIGS. 6A to 6F are views showing a concrete example of messages indicated on the display 14 of the mobile communication terminal E in each of processing steps before reproduction of the content is started. Incidentally, as described later, since the mobile communication terminal B also acquires the content acquisition software, the messages shown in FIGS. 6A to 6F are also indicated on the display 14 of the mobile communication terminal B in this example. Further, as described later, the owners of the mobile communication terminals C and D do not acquire the content acquisition software in this example (i.e., their select "NO" in FIG. 6B). Thus, the messages shown in FIGS. 6C to 6F are not indicated on the display 14 of each of the mobile communication terminals C and D.

First, as shown in FIG. 3, the mobile communication terminal A starts content distribution processing (step S1 of FIG. 3). Incidentally, it is supposed that the content acquisition software is not previously downloaded to the storage section 16 of each of the mobile communication terminals B-E in this example.

Next, the mobile communication terminal A searches for mobile communication terminals registered in the wireless communication network system 10 (step S2 of FIG. 3). In this step, the mobile communication terminal A can confirm that the mobile communication terminals B-E are registered in the network.

Next, the mobile communication terminal A transmits information about details of the content acquisition software to the mobile communication terminals B-E (step S3 of FIGS. 3 and 4). At this time, in addition to such information, the mobile communication terminal A may also transmits a download support software, a reproduction software and/or the like for reproducing such information. Incidentally, step S3 may either be executed on a command (such as a DLNA command for example), or be executed periodically.

Further, in step 3, a screen as shown in FIG. 5A may be indicated on the display 14 of the mobile communication terminal A for selecting the content acquisition software. Herein, when the content acquisition software has been selected, a message asking whether or not to transmit the information about details of the content acquisition software to the mobile communication terminals B-E is indicated as shown in FIG. 5B.

On the other hand, in step S3, the display 14 of the mobile communication terminal E is switched from the stand-by screen (as shown in FIG. 6A) to a screen which shows a message asking whether or not to install the content acquisition software (as shown in FIG. 6B).

The owners of the mobile communication terminals B-E who have received the information about details of the content acquisition software in step S3 decide whether or not to acquire the content acquisition software based on the details of the information. In this example, it is supposed that the owners of the mobile communication terminals B and E decide to acquire the content acquisition software, and the owners of the mobile communication terminals C and D decide not to acquire the content acquisition software.

The owners of the mobile communication terminal B who has decided to acquire the content acquisition software in step S3 transmits a distribution request signal to the mobile communication terminal A to request the content acquisition software (step S4 of FIGS. 3 and 4). In the same manner, the owners of the mobile communication terminal E who has decided to acquire the content acquisition software in step S3 also transmits a distribution request signal to the mobile communication terminal A to request the content acquisition software (step S6 of FIGS. 3 and 4).

Next, upon receiving the distribution request signal for the content acquisition software from the mobile communication terminal B, the mobile communication terminal A transmits the content acquisition software to the mobile communication terminal B (step S5 of FIGS. 3 and 4). In the same manner, upon receiving the distribution request signal for the content acquisition software from the mobile communication terminal E, the mobile communication terminal A transmits the content acquisition software to the mobile communication terminal E (step S7 of FIGS. 3 and 4).

Messages shown in FIG. 5C and FIG. 5D are example messages indicated on the display 14 of the mobile communication terminal A respectively at the time immediately before steps S5 and S7 and at the time immediately after steps S5 and S7. FIG. 5C is an example message indicated immediately before the content acquisition software is transmitted, which asks whether or not to transmit the content acquisition software. FIG. 5D is an example message indicated immediately after the content acquisition software is transmitted, which says that the permissions of the content acquisition software can be changed later.

Further, in the time while the content acquisition software is being downloaded to the mobile communication terminal E in steps S5 and S7, download status of the content acquisition software shown in FIG. 6C, for example, is indicated on the display 14 of the mobile communication terminal E. Further, when the download of the content acquisition software is completed, a message shown in FIG. 6D is indicated on the display 14 of the mobile communication terminal E, which asks whether or not to start the content acquisition software.

Further, after the download of the content acquisition software to the mobile communication terminals B and E is completed, the content acquisition software is started (by selecting "Yes" from the screen shown in FIG. 6D, for example). Then a message shown in FIG. 6E is indicated on the display 14 of the mobile communication terminal E, which indicates that the content acquisition software is being started.

Next, as soon as the content acquisition software is started and brought into a state where it operates effectively, the mobile communication terminals B and E are brought into a state where they can acquire the content currently being reproduced on the TV 1 through the content acquisition software. At this time, a message shown in FIG. 6F is indicated on the display 14 of the mobile communication terminal E, which asks whether or not to download the content, and the mobile communication terminal E is brought into a stand-by state.

Note that, although the selection of whether or not to start the content acquisition software is made after the content acquisition software has been downloaded in this example, the present invention is not limited thereto. The content acquisition software may also be automatically started after the content acquisition software has been downloaded.

As described above, it is brought into a state where the content currently being reproduced on the TV 1 can be acquired by the mobile communication terminals B and E during the period when the content is being reproduced.

Processing of acquiring the content currently being reproduced through the content acquisition software by the owners of the mobile communication terminals B and E, after the content acquisition software is started, will be described below with reference to FIGS. 7 to 9. Incidentally, the present example is described using an example in which a slide show is reproduced on the TV 1 in the wireless communication network system 10.

Figure 7:
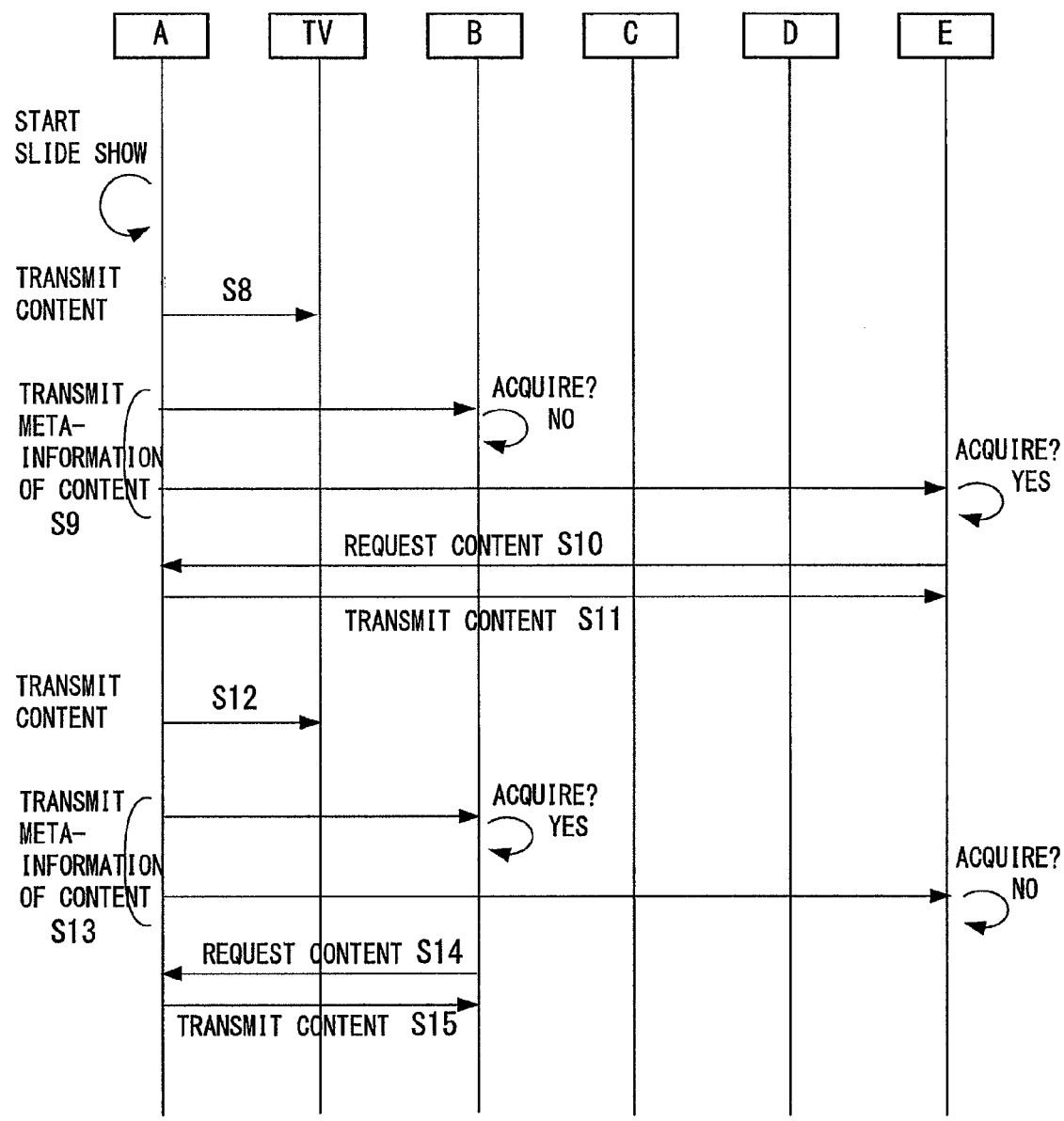
FIG. 7 is a view showing the flow of processing operation of a content distribution processing example 1 in time sequence, after reproduction of the content is started.
Figure 8:
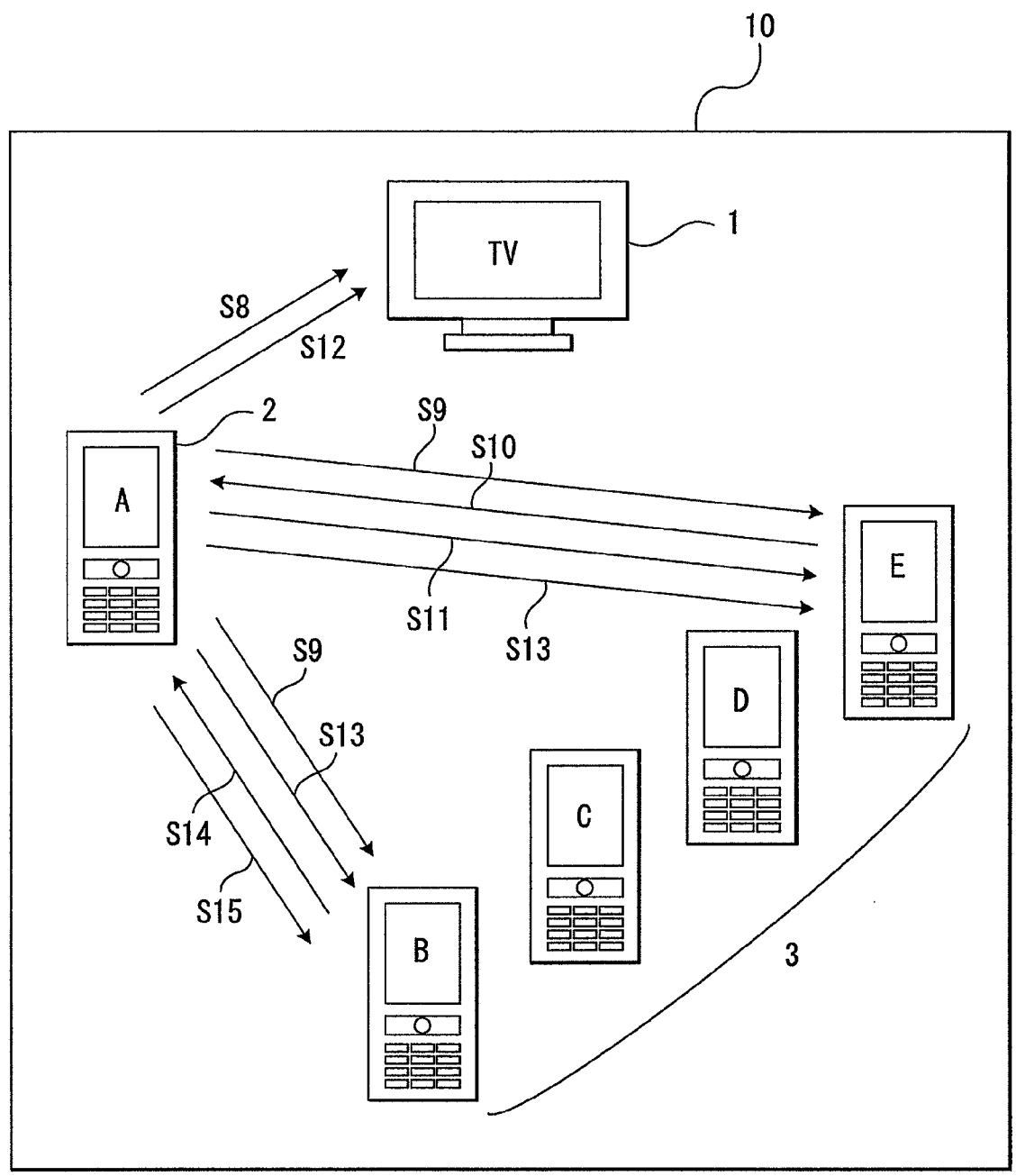
FIG. 8 is a view showing the flow of data in spatial sequence during the processing operation of the content distribution processing example 1, after reproduction of the content is started.
Figure 9:
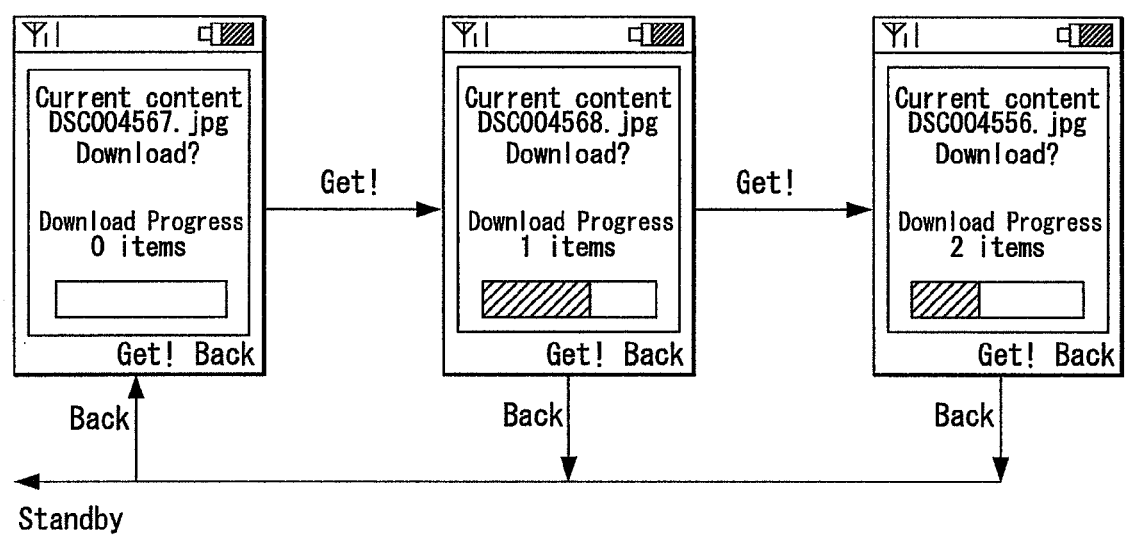
FIGS. 9A to 9C are views showing an example of messages indicated on a display of a mobile communication terminal that receives content, in each of processing steps of the content distribution processing example 1 after reproduction of the content is started.

FIG. 7 and FIG. 8 each show the flow of information between the respective devices after reproduction of the content is started. FIG. 7 is a view showing the flow of information between the respective devices in time sequence; and FIG. 8 is a view showing the flow of information between the respective devices in spatial sequence. Further, FIG. 9 is a view showing a concrete example of messages indicated on the display 14 of the mobile communication terminal B or E in each of processing steps after reproduction of the content is started.

First, the mobile communication terminal A transmits the data of the content to the TV 1 to start the slide show (step S8 of FIGS. 7 and 8). Incidentally, the media type and reproduction of the content supplied to the TV 1 is controlled by the mobile communication terminal A. At this stage, the content data is shared between the mobile communication terminal A and the TV 1 within the wireless communication network system 10 regardless of the number of the mobile communication terminals having the content acquisition software installed therein.

Next, the mobile communication terminal A transmits meta-information of the content currently being reproduced (such as name of the content, file name of the content data and the like) to the mobile communication terminals B and E to which the content acquisition software has been installed (step S9 of FIGS. 7 and 8). At this time, a message shown in FIG. 9A is indicated on the display 14 of each of the mobile communication terminals B and E, which asks whether or not to download the content currently being reproduced.

Further, the owners of the mobile communication terminals B and E decide whether or not to acquire the content currently being reproduced, and if they decide to acquire the content, then they transmit a content acquisition request signal to the mobile communication terminal A through the content acquisition software. At this time, the meta-information of the content is also transmitted to the mobile communication terminal A together with the content acquisition request signal.

Incidentally, in this stage, as shown in FIG. 7, it is supposed that the owner of the mobile communication terminal E decides to acquire the content currently being reproduced, while the owner of the mobile communication terminal B decides not to acquire the content. Thus, the owner of the mobile communication terminal E who has received meta-information of the content currently reproduced in step S9 transmits a content acquisition request signal to the mobile communication terminal A through the content acquisition software (step S10 of FIGS. 7 and 8).

At this time, in order to facilitate operation for the user, it is preferred that, for example, the user single-clicks a button "Get!" on the display 14 shown in FIG. 9A to submit a content acquisition request.

Next, the mobile communication terminal A, which has received the acquisition request signal for requesting the content currently being reproduced from the mobile communication terminal E, confirms the meta-information of the content transmitted together with the acquisition request signal. Further, the mobile communication terminal A transmits the data of the content currently being reproduced corresponding to the meta-information to the mobile communication terminal E through the content acquisition software (step S11 of FIGS. 7 and 8). At this time, download progress shown in FIG. 9B is indicated on the display 14 of the mobile communication terminal E. Incidentally, in the example shown in FIG. 9B, meta-information of the next content is shown on the screen while the data of the current content is being downloaded.

With the above steps, the mobile communication terminal E can acquire the content currently being reproduced through the content acquisition software. In this stage of acquiring the content, the data of content is shared by the mobile communication terminal A, the mobile communication terminal E and the TV 1.

Next, data of a new content is transmitted from the mobile communication terminal A to the TV 1, and the content reproduced by the TV 1 is switched to the new one (step S12 of FIGS. 7 and 8).

Next, the mobile communication terminal A transmits again meta-information of the new content currently being reproduced to the mobile communication terminals B and E to which the content acquisition software has been installed (step S13 of FIGS. 7 and 8).

Next, the owners of the mobile communication terminals B and E decide whether or not to acquire the new content currently being reproduced, and if they decide to acquire the content, then they transmit a content acquisition request signal to the mobile communication terminal A through the content acquisition software. At this time, the meta-information of the content is also transmitted to the mobile communication terminal A together with the content acquisition request signal.

Incidentally, in this stage, as shown in FIG. 7, it is supposed that the owner of the mobile communication terminal B decides to acquire the content currently being reproduced, while the owner of the mobile communication terminal E decides not to acquire the content. Thus, the owner of the mobile communication terminal B who has received meta-information of the content currently reproduced in step S13 transmits a content acquisition request signal to the mobile communication terminal A through the content acquisition software (step S14 of FIGS. 7 and 8).

Next, the mobile communication terminal A, which has received the acquisition request signal for requesting the content currently being reproduced from the mobile communication terminal B, confirms the meta-information of the content transmitted together with the acquisition request signal. Further, the mobile communication terminal A transmits the data of the content currently being reproduced corresponding to the meta-information to the mobile communication terminal B through the content acquisition software (step S15 of FIGS. 7 and 8).

With the above steps, the mobile communication terminal B can acquire the new content currently being reproduced. In this stage of acquiring the content, the data of content is shared by the mobile communication terminal A, the mobile communication terminal B and the TV 1.

In the content distribution processing of this example, the processing after step S8 is repeated until the slide show is complete.

Incidentally, the content currently being reproduced is in a state ready to be downloaded during the period when the content acquisition software is being run (see FIG. 6F). Thus, in the aforesaid step S13, in the case where the owner of the mobile communication terminal E wants to acquire the new content, he or she can continue to acquire the new content simply by clicking the button "Get!" on the display 14 shown in FIG. 9B and FIG. 9C for example.

As described above, in the wireless communication network system 10 according to the present embodiment, the communication terminal 3, which is a terminal other than the server 2 and the reproducing device 1, can acquire the content currently being reproduced easily and immediately through the content acquisition software.

[Content Distribution Processing Example 2]

A content distribution processing example 2 according to the present embodiment will be described below. The content distribution processing example 2 differs from the content distribution processing example 1 in the processing operation after reproduction of the content is started. The processing operation before reproduction of the content is started is identical to that of the content distribution processing example 1 (see FIGS. 3 to 7). Thus, only the processing operation after reproduction of the content is started will be described below, and the processing operation before reproduction of the content is started will not be described again.

Figure 10:
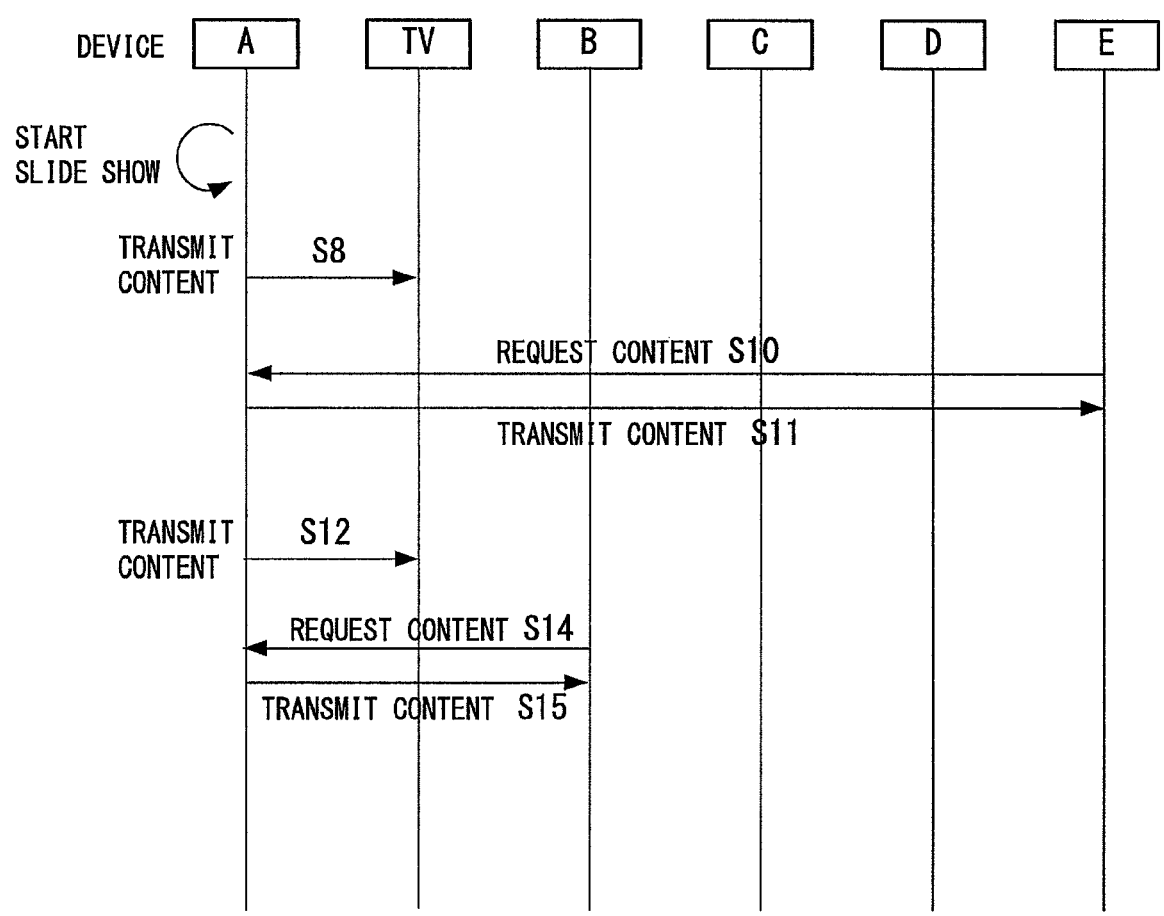
FIG. 10 is a view showing the flow of processing operation of a content distribution processing example 2 in time sequence, after reproduction of the content is started.

The processing operation after reproduction of the content is started in the wireless communication network system 10 according to this example will be described below with reference to FIGS. 10 and 11. FIG. 10 is a view showing the flow of information between the respective devices in time sequence after reproduction of the content is started; and FIG. 11 is a view showing the flow of information between the respective devices in spatial sequence.

Incidentally, the present example is also described using the example in which a slide show is reproduced on the TV 1 in the wireless communication network system 10. Further, in the content distribution processing example 2, like in the content distribution processing example 1, it is supposed that the mobile communication terminals B and E have the content acquisition software installed therein from the mobile communication terminal A in the processing operation before reproduction of the content is started. Note that, in order to make correspondence relation to FIG. 10 clear, it is supposed that the server 2 is the mobile communication terminal A, and the four communication terminals 3 are the mobile communication terminals B-E in the description below.

Figure 11:
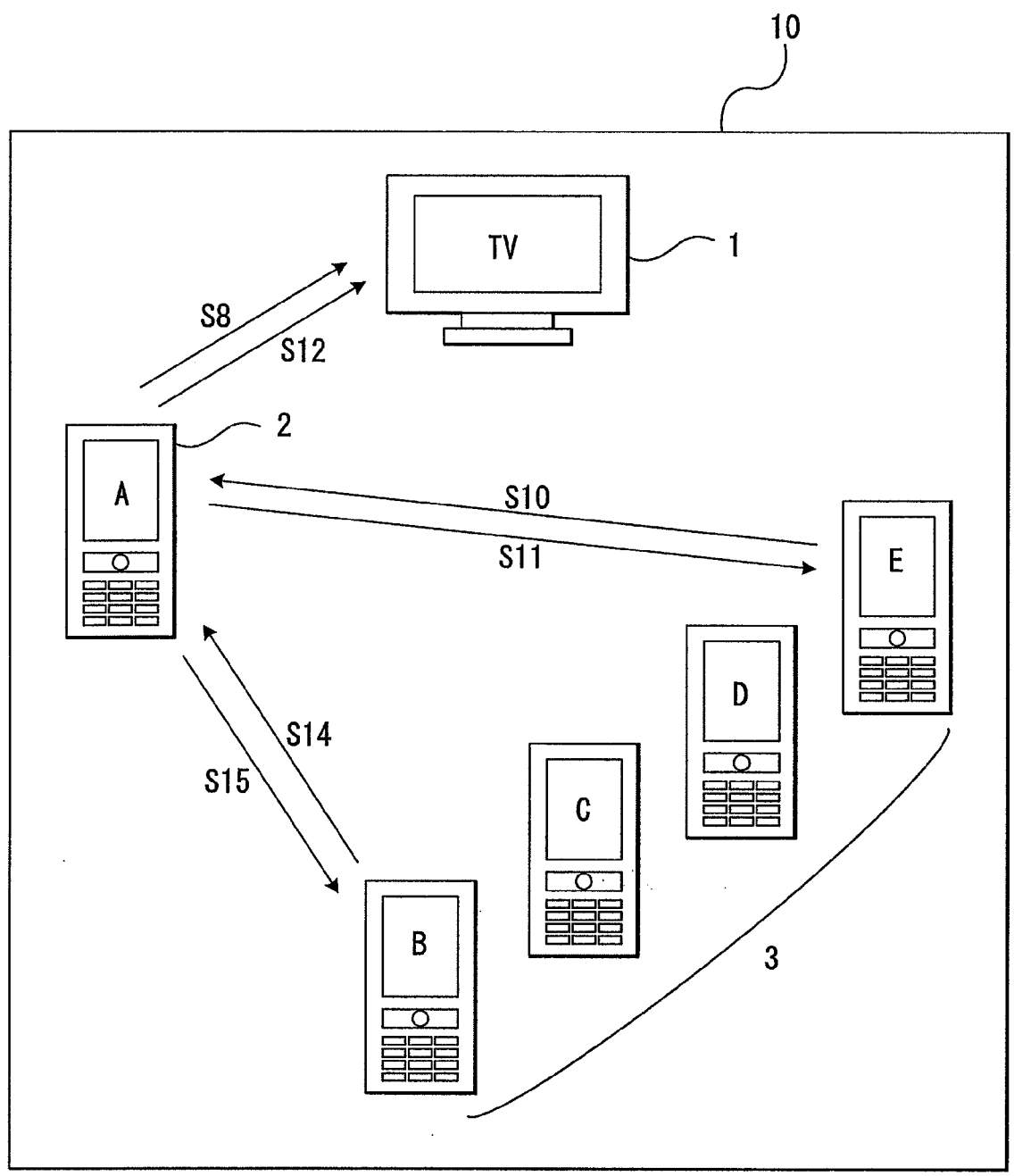
FIG. 11 is a view showing the flow of data in spatial sequence during the processing operation of the content distribution processing example 2, after reproduction of the content is started.

First, the mobile communication terminal A transmits data of the content to the TV 1 to start the slide show (step S8 of FIGS. 10 and 11). At this stage, the content data is shared between the mobile communication terminal A and the TV 1 within the wireless communication network system 10 regardless of the number of the mobile communication terminals having the content acquisition software installed therein.

Next, the owner of the mobile communication terminal E who are watching the content currently being reproduced decides to acquire the content currently being reproduced, and transmits a content acquisition request signal to the mobile communication terminal A through the content acquisition software (step S10 of FIGS. 10 and 11).

Next, the mobile communication terminal A, which has received the acquisition request signal for requesting the content currently being reproduced from the mobile communication terminal E, transmits the content currently being reproduced to the mobile communication terminal E through the content acquisition software (step S11 of FIGS. 10 and 11).

Incidentally, during the period when the content is being reproduced, some sort of information about the content currently being reproduced is recognized by the mobile communication terminal A that supplies the content. Thus, even in the case where the content acquisition request is directly transmitted to the mobile communication terminal A during the period when the content is being reproduced like in this example, the content currently being reproduced can be transmitted to the mobile communication terminal that requests the content through the information about the content currently being reproduced recognized by the mobile communication terminal A.

In this example, the mobile communication terminal E can acquire the content currently being reproduced through the content acquisition software with the above steps.

Next, data of a new content is transmitted from the mobile communication terminal A to the TV 1, and the content reproduced by the TV 1 is switched to the new one (step S12 of FIGS. 10 and 11).

Next, the owner of the mobile communication terminal B who are watching the content currently being reproduced decides to acquire the new content currently being reproduced, and transmits a content acquisition request signal to the mobile communication terminal A through the content acquisition software (step S14 of FIGS. 10 and 11).

Next, the mobile communication terminal A, which has received the acquisition request signal for requesting the new content currently being reproduced from the mobile communication terminal B, transmits the new content currently being reproduced to the mobile communication terminal B through the content acquisition software (step S15 of FIGS. 10 and 11). In this example, the mobile communication terminal B can acquire the new content currently being reproduced with the above steps.

In the content distribution processing of this example, the processing after step S8 is repeated until the slide show is complete.

In the content distribution processing example 1, when the mobile communication terminal B or E transmits a content acquisition request to the mobile communication terminal A, the meta-information of the content transmitted from the mobile communication terminal A is used an inquiry information of the content data to be acquired. In contrast, in the content distribution processing example 2 described above, the mobile communication terminal B or E directly submits a content acquisition request to the mobile communication terminal A without using the inquiry information of the content transmitted from the mobile communication terminal A. In other words, in the content distribution processing example 2, steps S9 and S13 of the content distribution processing example 1 are omitted. Thus, in the content distribution processing example 2, the viewers can acquire the content more easily and immediately.

[Content Distribution Processing Example 3]

A content distribution processing example 3 according to the present embodiment will be described below. The content distribution processing example 3 differs from the content distribution processing examples 1 and 2 in the processing operation after reproduction of the content is started. Specifically, in this example, when the communication terminal 3 transmits a content acquisition request to the server 2, a URI (Uniform Resource Identifier) which expresses the address of the content data is used as the inquiry information of the content to be acquired.

Incidentally, in this example, the processing operation before reproduction of the content is started is identical to that of the content distribution processing example 1 (see FIGS. 3 to 7). Thus, only the processing operation after reproduction of the content is started will be described below, and the processing operation before reproduction of the content is started will not be described again.

Figure 12:
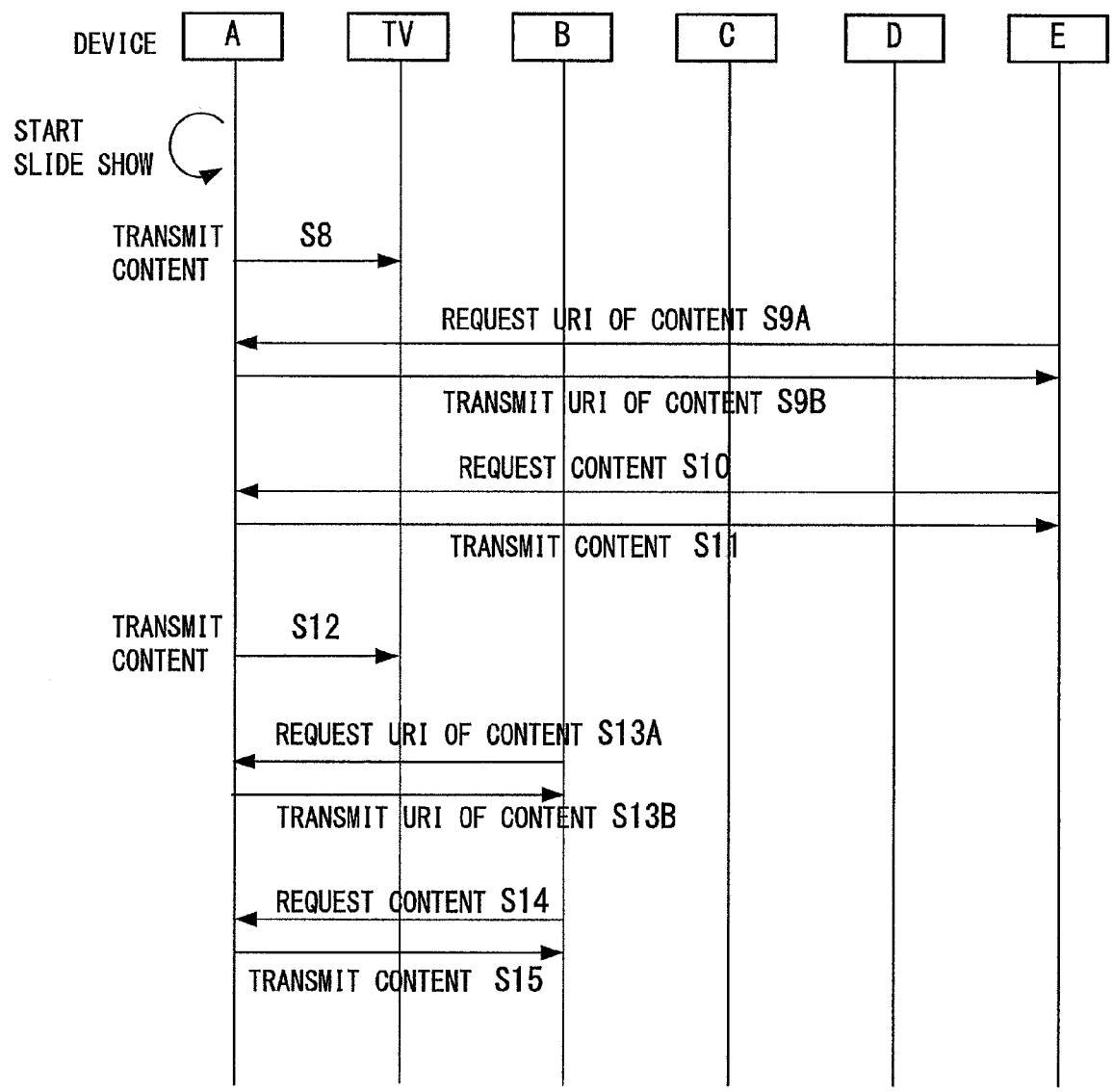
FIG. 12 is a view showing the flow of processing operation of a content distribution processing example 3 in time sequence, after reproduction of the content is started.

The processing operation after reproduction of the content is started in the wireless communication network system 10 according to this example will be described below with reference to FIGS. 12 and 13. FIG. 12 is a view showing the flow of information between the respective devices in time sequence after reproduction of the content is started; and FIG. 13 is a view showing the flow of information between the respective devices in spatial sequence.

Incidentally, the present example is also described using the example in which a slide show is reproduced on the TV 1 in the wireless communication network system 10. Further, in the content distribution processing example 3, like in the content distribution processing examples 1 and 2, it is supposed that the mobile communication terminals B and E have the content acquisition software installed therein from the mobile communication terminal A in the processing operation before reproduction of the content is started. Note that, in order to make correspondence relation to FIG. 12 clear, it is supposed that the server 2 is the mobile communication terminal A, and the four communication terminals 3 are the mobile communication terminals B-E in the description below.

Figure 13:
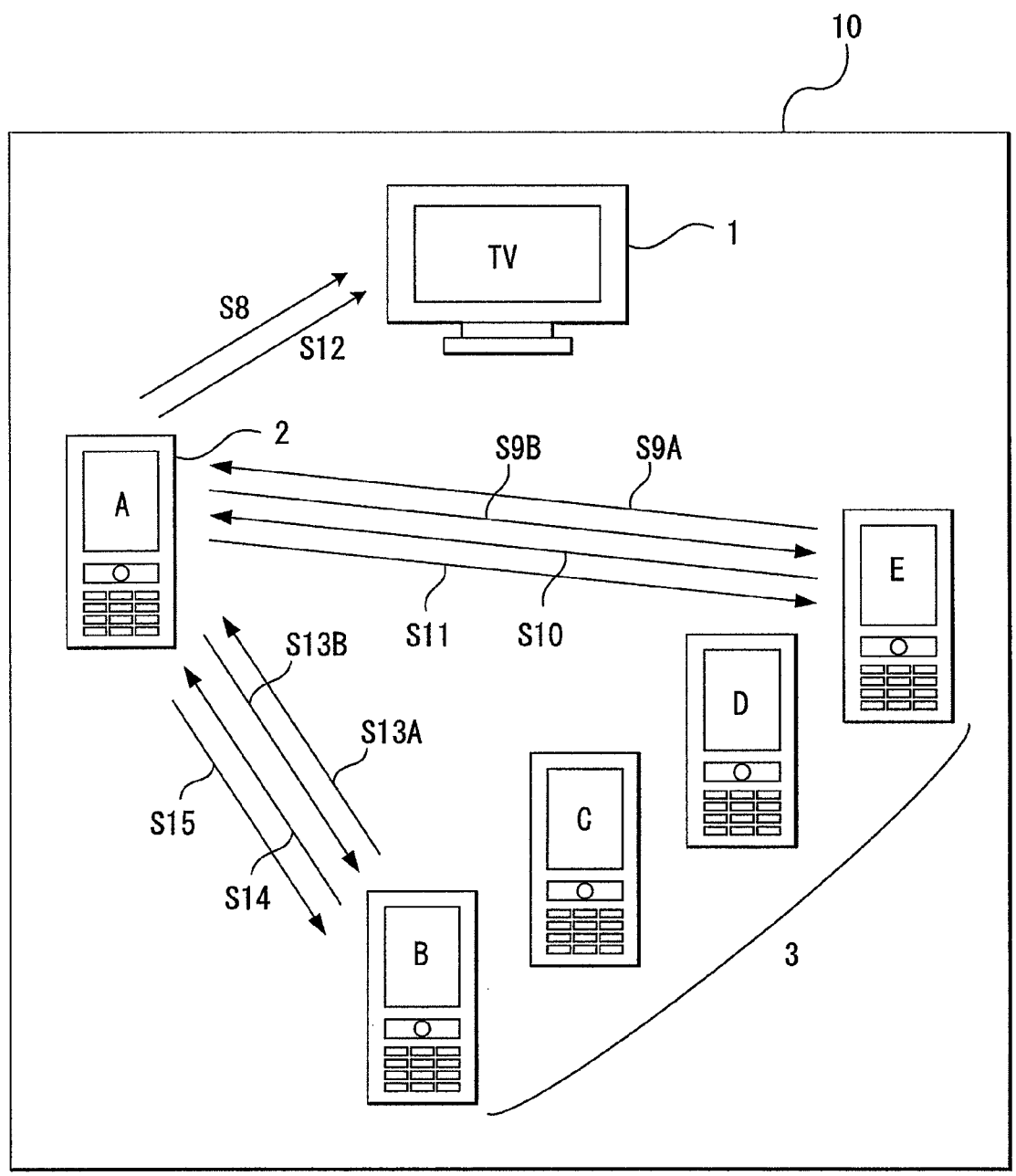
FIG. 13 is a view showing the flow of data in spatial sequence during the processing operation of the content distribution processing example 3, after reproduction of the content is started.

First, the mobile communication terminal A transmits the data of the content to the TV 1 to start the slide show (step S8 of FIGS. 12 and 13). At this stage, the content is shared between the mobile communication terminal A and the TV 1 within the wireless communication network system 10 regardless of the number of the mobile communication terminals having the content acquisition software installed therein.

Next, the owner of the mobile communication terminal E who are watching the content currently being reproduced decides to acquire the content currently being reproduced, and transmits an acquisition request signal for requesting the URI of the content to the mobile communication terminal A (step S9A of FIGS. 12 and 13). Incidentally, the request operation may also be performed by a DLNA command through the content acquisition software.

Next, the mobile communication terminal A, which has received the acquisition request signal for requesting the URI of the content currently being reproduced from the mobile communication terminal E, transmits the URI of the content to the mobile communication terminal E through the content acquisition software (step S9B of FIGS. 12 and 13).

Thus, the owner of the mobile communication terminal E who has received the URI of the content transmits a content acquisition request signal to the mobile communication terminal A through the content acquisition software (step S10 of FIGS. 12 and 13). At this time, the URI the content is also transmitted to the mobile communication terminal A together with the content acquisition request signal.

Next, the mobile communication terminal A, which has received the acquisition request signal for requesting the content currently being reproduced from the mobile communication terminal E, confirms the URI of the content transmitted together with the acquisition request signal. Further, the mobile communication terminal A transmits the data of the content currently being reproduced corresponding to the URI to the mobile communication terminal E through the content acquisition software (step S11 of FIGS. 12 and 13). In this example, the mobile communication terminal E can acquire the content currently being reproduced through the content acquisition software with the above steps.

Next, data of a new content is transmitted from the mobile communication terminal A to the TV 1, and the content reproduced by the TV 1 is switched to the new one (step S12 of FIGS. 12 and 13).

Next, the owner of the mobile communication terminal B who are watching the new content currently being reproduced decides to acquire the content currently being reproduced, and transmits an acquisition request signal for requesting the URI of the content to the mobile communication terminal A (step S13A of FIGS. 12 and 13).

Next, the mobile communication terminal A, which has received the acquisition request signal for requesting the URI of the content currently being reproduced from the mobile communication terminal B, transmits the URI of the content to the mobile communication terminal B through the content acquisition software (step S13B of FIGS. 12 and 13).

Thus, the owner of the mobile communication terminal B who has received the URI of the content transmits a content acquisition request signal to the mobile communication terminal A through the content acquisition software (step S14 of FIGS. 12 and 13). At this time, the URI the content is also transmitted to the mobile communication terminal A together with the content acquisition request signal.

Next, the mobile communication terminal A, which has received the acquisition request signal for requesting the content currently being reproduced from the mobile communication terminal B, confirms the URI of the content transmitted together with the acquisition request signal. Further, the mobile communication terminal A transmits the data of the content currently being reproduced corresponding to the URI to the mobile communication terminal B through the content acquisition software (step S15 of FIGS. 12 and 13). In this example, the mobile communication terminal B can acquire the new content currently being reproduced through the content acquisition software with the above steps.

In the content distribution processing of this example, the processing after step S8 is repeated until the slide show is complete.

As described above, in the content distribution processing example 3, the communication terminal 3, which is a terminal other than the server 2 and the reproducing device 1, can also acquire the content currently being reproduced easily and immediately through the content acquisition software.

Note that, although the aforesaid embodiments are described using an example in which the wireless communication network system is a local network system conforming to DLNA standard, the present invention is not limited thereto. The present invention can be applied to a wireless LAN system conforming to a standard equivalent to the DLNA standard.

Further, although the aforesaid embodiments are described using an example in which, as the wireless communication devices configuring the network system, the TV is used as the reproducing device, and the mobile communication terminals are used both as the server and the other communication terminals, the present invention is not limited thereto. Any device having content reproducing function can be used as the reproducing device. Further, the reproducing device may also be a device having server function (such as a personal computer) or the like. Further, the server and the other communication terminals may be any device as long as it can perform wireless communication.

Further, although the aforesaid embodiments are described using an example in which the server records the content data, stores the content data and controls the transmission of the content data, the present invention can also be applied to a configuration in which the job of recording and storing the content data is performed by a device, and the job of controlling the transmission of the content data is performed by another device.

The present application contains subject matter related to that disclosed in Japanese Priority Patent Application JP 2008-113001 filed in the Japan Patent Office on Apr. 23, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A first communication terminal comprising:
a processor in communication with a memory with instructions stored in said memory executed by said processor to provide:
a transmitting section for transmitting, by wireless communication over a local wireless communication network system which only allows data to be shared between the first communication terminal and a reproducing device when content is reproduced and does not allow the content that is currently being reproduced to be acquired by a second communication terminal which does not have acquisition software, (a) predetermined content to the reproducing device and (b) predetermined message data and the predetermined content to the second communication terminal, both registered in the local wireless communication network system;
a storage section having the acquisition software stored therein, the acquisition software enables the second communication terminal to download a copy of the predetermined content currently being reproduced by the reproducing device during a period when the predetermined content is being reproduced, the storage section having the predetermined message data and the predetermined content stored therein; and
a controller for controlling the transmitting section (a) to transmit the predetermined content to the reproducing device over the local wireless communication network system and (b) to transmit the predetermined content and the acquisition software over the local wireless communication network system to the second communication terminal when the second communication terminal requests acquisition of the software after receiving the predetermined message data, wherein the second communication terminal uses the received acquisition software to download the copy of the predetermined content currently being transmitted to and reproduced by the reproducing device.

2. The communication terminal according to claim 1, wherein the wireless communication network system conforms to the DLNA standard.

3. The communication terminal according to claim 1, wherein the data of the content is stored in the storage section.

4. The communication terminal according to claim 1, wherein the predetermined message data being information about the software.

5. A first communication terminal comprising:
a processor in communication with a memory with instructions stored in said memory executed by said processor to provide:
a receiving section for receiving, by wireless communication over a local wireless communication network system which only allows data to be shared between a second communication terminal and a reproducing device when content is reproduced and does not allow the content that is currently being reproduced to be acquired by the first communication terminal which does not have acquisition software, predetermined message data from a server registered in the local wireless communication network system;
a storage section for storing therein the acquisition software received from the server over the local wireless communication network system, the acquisition software enables downloading a copy of a predetermined content currently being reproduced by a reproducing device, which is registered in the local wireless communication network system, during a period when the predetermined content is being transmitted to and reproduced by the reproducing device; and
a controller for controlling the receiving section to receive the predetermined content from the server using the acquisition software after receiving the predetermined message data from the server and the acquisition software from the server.

6. The communication terminal according to claim 5, wherein the software is stored in the storage section.

7. The communication terminal according to claim 5, wherein the controller controls the receiving section to receive the software from the server.

8. The communication terminal according to claim 5 wherein the predetermined message data being information about the software.

9. A wireless communication network system comprising:
one or more processors in communication with one or more memories with instructions stored in said one or more memories executed by said one or more processors to provide:
a local wireless communication system which only allows data to be shared between a first communication terminal and a reproducing device when content is reproduced and does not allow the content that is currently being reproduced to be acquired by a second communication terminal which does not have acquisition software;
a reproducing device for reproducing a predetermined content;
the first communication terminal; and
the second communication terminal,
wherein the first communication terminal includes a receiving section for receiving predetermined message data over the local wireless communication system from the second communication terminal, a first storage section for storing therein the acquisition software received from the second communication terminal over the local wireless communication system, the acquisition software enables downloading a copy of predetermined content, currently being reproduced by the reproducing device, during a period when the predetermined content is being reproduced, and a first controller for controlling the receiving section to receive the predetermined content over the local wireless communication system from the second communication terminal using the acquisition software after receiving the predetermined message data and requesting the second communication terminal send the predetermined content thereto, and
wherein the second communication terminal includes a second storage section having the acquisition software, the predetermined message data and the predetermined content stored therein, a transmitting section for transmitting the predetermined content to the reproducing device over the local wireless communication system and for transmitting the predetermined message data and the predetermined content over the local wireless communication system to the first communication terminal by wireless communication, and a second controller for controlling the transmitting section (a) to transmit the predetermined content to the reproducing device over the local wireless communication system and (b) to transmit the acquisition software over the local wireless communication system to the first communication terminal when the first communication terminal requests the software after receiving the predetermined message data, wherein the first communication terminal uses the received acquisition software to download from the second communication terminal the copy of the predetermined content currently being transmitted to and reproduced by the reproducing device during the period when the predetermined content is being reproduced.

10. The wireless communication network system according to claim 9, wherein the predetermined message data being information about the software.

11. A content distribution method comprising the steps of:
causing a server to supply a first communication terminal with acquisition software stored therein, the acquisition software enables downloading, over a local wireless communication network system, data shared only between a second communication terminal and a reproducing device when content is reproduced and does not allow the content that is currently being reproduced to be acquired from the server by the first communication terminal which does not have the acquisition software during a period when the predetermined content is being reproduced, where the server, the first and second communication terminals and the reproducing device are registered in the local wireless communication network system;
causing the server to transmit, over the local wireless communication network system, the predetermined content stored therein to the reproducing device to allow the reproducing device to reproduce the predetermined content;
causing the first communication terminal to transmit, over the local wireless communication network system, a request for acquiring the predetermined content to the server during the period when the predetermined content is being transmitted to and reproduced by the reproducing device after the first communication terminal receives predetermined message data from the server; and causing the server to, during the period when the predetermined content is being reproduced, receive the request for acquiring the predetermined content from the first communication terminal and to transmit the predetermined content to the first communication terminal which uses the acquisition software to download the copy of the predetermined content.

12. The content distribution method according to claim 11, wherein the predetermined message data being information about the software.

* * * * *